United States Patent [19]

Machi et al.

[11] 4,376,794
[45] Mar. 15, 1983

[54] PROCESS FOR PRODUCTION OF SEPARATORS FOR USE IN CELLS

[75] Inventors: Sueo Machi, Takasaki; Isao Ishigaki, Maebashi; Takanobu Sugo, Gunma; Kazuo Murata; Shiro Tanso, both of Takatsuki; Keizi Senoo, Takasaki, all of Japan

[73] Assignees: Japan Atomic Energy Research Inst., Tokyo; Yuasa Battery Co., Ltd., Osaka, both of Japan

[21] Appl. No.: 308,904

[22] Filed: Oct. 5, 1981

Related U.S. Application Data

[63] Continuation-in-part of Ser. No. 118,101, Feb. 4, 1980, abandoned.

[30] Foreign Application Priority Data

Feb. 5, 1979 [JP] Japan .................................. 54-11982
Feb. 5, 1979 [JP] Japan .................................. 54-11984
Feb. 5, 1979 [JP] Japan .................................. 54-11986
Feb. 5, 1979 [JP] Japan .................................. 54-11988

[51] Int. Cl.$^3$ ............................................. B05D 3/06
[52] U.S. Cl. ................................. 427/44; 204/159.22
[58] Field of Search ............... 427/35, 3 L, 44, 54.1; 204/159.11, 159.15, 159.2, 159.14, 159.22

[56] References Cited

U.S. PATENT DOCUMENTS

| | | | |
|---|---|---|---|
| 3,088,791 | 5/1963 | Cline et al. | 427/44 |
| 3,188,165 | 6/1965 | Magat et al. | 427/35 |
| 3,322,661 | 5/1967 | Yoshikawa et al. | 204/159.17 |
| 3,427,206 | 2/1969 | Scardaville et al. | 427/44 |
| 3,955,014 | 5/1976 | Mostev et al. | 427/54.1 |

Primary Examiner—John H. Newsome
Attorney, Agent, or Firm—Browdy & Neimark

[57] ABSTRACT

A novel process for the production of a separator for use in a cell to prevent the short-circuiting of positive active material and negative active material comprises irradiating a polyolefin film 150 μm or less thick with ionizing radiation at a dose rate of $5 \times 10^4 – 10^7$ rads/sec. to give a total dose of 1 Mrad or more, contacting the irradiated film with an aqueous solution of a terminally unsaturated monomer such as acrylic acid, methacrylic acid and the like at a temperature of 10° C.–60° C. to thereby cause grafting of the monomer onto the polyolefin film before the grafted polymer film is treated with an aqueous alkaline solution to finally obtain the separator for use in a cell, which is substantially improved in that it shows low electrical resistance and is excellent both in its acid resistance and mechanical strength.

20 Claims, 5 Drawing Figures

PROCESS FOR PRODUCTION OF SEPARATORS FOR USE IN CELLS

BACKGROUND OF THE INVENTION

This is a continuation-in-part application of U.S. patent application Ser. No. 118,101 filed on Feb. 4, 1980 now abandoned.

It is known to use a graft copolymer membrane prepared by grafting a graft monomer such as acrylic acid onto a film of polyethylene as a separator to be used in primary and secondary batteries or cells comprising an electrolyte of an aqueous solution of acid or alkali. Such graft copolymer membrane is excellent both in chemical resistance and mechanical strength, and the use thereof as a separator in cells substantially improves both cycle life and storage life of the cells. However, since polyethylene is highly hydrophobic, a graft copolymer membrane comprising the film base of polyethylene prepared in a conventional manner does not allow the uniform penetration of an electrolyte into the depth of the membrane. For this reason, the membrane thus prepared generally showed an electrical resistance which was too high for the membrane to be useful as a separator. Thus, the use of such membrane would result in the cells being impaired in some characteristics such as discharge properties, high rate discharge properties, low temperature properties, etc. Accordingly, the use of the above mentioned conventional type separator was limited only to specific applications.

The use of a graft copolymer membrane obtained by grafting acrylic acid on a film of polyethylene as a separator in a cell is disclosed in the U.S. Pat. No. 3,427,206. According to the disclosure in the same patent, a film of polyethylene is immersed in a solution consisting of a mixture of an aromatic hydrocarbon solvent such as benzene with acrylic acid (optionally with a small amount of carbon tetrachloride being added) under irradiation with gamma-rays to thereby produce a graft copolymer film having good electrical conductivity useful as a separator for use in a cell. However, the process of said U.S. Patent tends to produce homopolymer of acrylic acid and the uniform graft copolymerizing reaction of acrylic acid onto the film of polyethylene is difficult to obtain. Namely, acrylic acid homopolymerizes in the liquid phase to result in a large amount of homopolymer before the same monomer is grafted onto the film of polyethylene under irradiation with ionizing radiation.

The formation of homopolymer of acrylic acid results not only in substantial loss of acrylic acid as mentioned above but also in difficulty in removing the resulting homopolymer from the same film to which it adheres because of its adhesiveness. When graft reaction occurs at certain sites of polyethylene, the diffusion of acrylic acid into said sites is promoted, and accordingly, it is difficult to form a uniformly grafted film in the case when the rate of polymerization of acrylic acid is high. Other conventional processes for the production of graft copolymer membranes are also almost the same as the process disclosed in said U.S. Pat. No. 3,427,206 not only in the aspect that an organic substance film sheet is immersed in an aqueous monomer solution followed by bringing about the graft copolymerizing reaction under irradiation with ionizing radiation but also in the other characteristics.

OBJECTS OF THE INVENTION

The first object of the present invention is to provide a separator for use in a cell which is excellent in both acid resistance and mechanical strength and has good electrical conductivity.

The other object of the present invention is to provide a process for the production of a uniformly grafted polymeric membrane in which the formation of homopolymer is limited to the minimum to thereby improve the utilization rate of the monomer used for grafting.

A further object of the present invention is to provide a process for graft copolymerization which produces uniform graft copolymerization in good yield and economically.

In the following lines, the present invention will be explained in detail by reference to some preferred embodiments of the invention and the drawings attached hereto.

DETAILED EXPLANATION OF THE INVENTION

Figure 1:
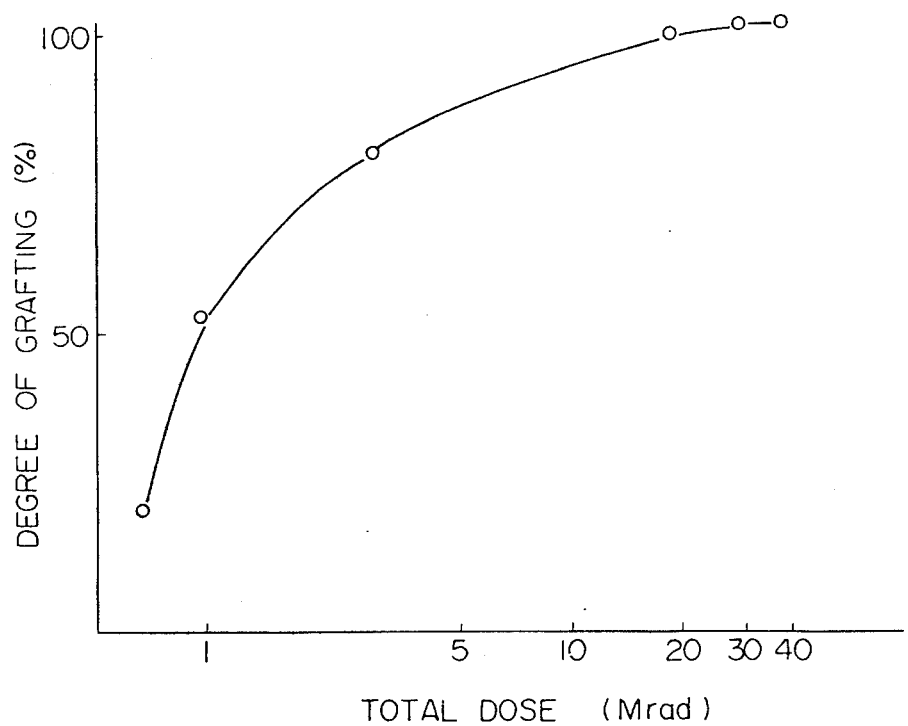
FIG. 1 shows the relation between the dosage of ionizing radiation and the degree of grafting in the production process of the present invention.

As a result of our extensive and elaborate study of graft copolymerizing reactions of terminally unsaturated monomers onto organic polymers under irradiation with ionizing radiation having strong penetrating power, we have found that a graft copolymer membrane obtained by a process comprising many steps each containing limited condition or conditions may have improved performance. Namely, the process for the production of a separator for use in a cell according to the present invention is characterized in that it comprises the steps of irradiating a film or sheet (hereunder simply referred to as "film") of an organic polymer 150 μm or less thick with ionizing radiation for a dosage of 1 Mrad or more, contacting the irradiated film with an aqueous solution of a terminally unsaturated monomer to bring about the graft copolymerization and then treating the grafted film with an aqueous alkali solution.

It is practically impossible from the standpoint of mechanical strength to make the thickness of a conventional separator 200 μm or less. In contrast, according to the present invention it is possible to employ a film 150 μm or less thick which is convenient for workability, and yet it is possible to provide a separator having excellent mechanical strength and chemical stability as well as low electrical resistance. Since the process of the present invention can be carried out according to the so-called pre-irradiation method in which the step of irradiating a film with ionizing radiation is separated from the step of grafting a graft monomer such as acrylic acid or/and methacrylic acid, it is entirely free from the defect inherent in the simultaneous irradiating method wherein irradiation is conducted with the coexistence of both the film and the graft monomer(s), which defect is that due to the formation of homopolymer as a result of the homopolymerization of a graft monomer, the progress of graft reaction is hindered. Thus, the production of extremely uniform graft copolymer membrane is ensured, and the meaningless consumption of the monomer due to such homopolymerization can be avoided easily. In addition, since the film to be used is 150 $\mu$m or less thick, low energy electron beam which is easy to handle can be used.

Any organic polymer film can be used as a base material for the production of the separator of the present invention, though polyolefins are particularly preferred. When polyethylene is selected from polyolefins, either low density or high density polyethylene can be used. In the former case when low density polyethylene is used, the initial rate of graft copolymerization is greater than the latter case when high density polyethylene is used, but the finally attainable degree of grafting is somewhat greater in the latter case than in the former case.

Dosage or total dose confirmed by experiments as being preferred in the practice of the present invention is 1 Mrad or more, the particularly preferred range being within 2–30 Mrads. If the dosage is less than 1 Mrad, the rate of grafting and the finally attainable degree of grafting are less than satisfactory. If it is more than 30 Mrads, the finally attainable degree of grafting is little or no more than that in the case when the dosage is 30 Mrads, with no remarkable advantage being added.

Irradiation with ionizing radiation may be carried out in vacuum or in an inert gas such as nitrogen or, alternatively, either in air or in oxygen. When irradiated in air, radicals formed by irradiation on the surface layer of the film react with oxygen to become peroxides which make the graft reaction start upon heating, while in the center layer of the film, radicals trapped in crystals make the graft reaction start. When irradiation is carried out in vacuum or in an atmosphere of an inert gas such as nitrogen, the graft reaction is considered to start from radicals trapped in crystals of polyethylene. When prepared in vacuum or in an inert gas, a film of uniform graft distribution is obtained. When prepared in air or in an atmosphere of oxygen at a relatively high temperature (60° C. or higher), rapid graft reaction generally proceeds due to the presence of radicals formed by the thermal decomposition of peroxides. However, when the graft reaction is carried out by pre-irradiation method using high dosage radiation such as electron beams, the influence of oxygen is not significant. In the course of studying graft copolymerization using a series of various polymer films, it has been found that if a thin film is employed, it is unnecessary to raise the temperature of reaction even when irradiation is conducted in air, and very high rate of polymerization reaction is ensured at a relatively low temperature (such as less than 60° C.). The graft copolymer film thus obtained shows low electrical resistance when used as a separator. Time of irradiation required in this process is short, and, also, both the rate of graft reaction and the degree of grafting are satisfactory. As is obvious from the above explanation, the process of this invention is superior both in productivity and economy.

The temperature for the reaction of irradiated film with an aqueous solution of a terminally unsaturated monomer which can be employed in the practice of the present invention is less than 60° C., with the range of 10°–60° C. being preferred. If the temperature exceeds 60° C., the rate of graft reaction is high, but the deactivation of radicals occurs more easily and accordingly it becomes more difficult to attain the uniform graft reaction. If the temperature becomes 10° C. or lower, the rate of graft reaction decreases significantly and the productivity is severely lowered. The reaction time partly depends on the reaction temperature. The reaction time can be arbitrarily selected, so long as it ensures the production of a graft copolymer film having the degree of grafting which is satisfactory to provide a separator with the desired performance characteristics.

It is effective to add a suitable amount of a ferrous salt or a cupric salt to the aqueous solution of a graft monomer in order to avoid the disadvantageous homopolymerization which generally occurs in the step of graft reaction or during the storage of the same aqueous solution. The proper amount of addition of these inhibitors of homopolymerization is within the range of 0.01–2.5% by weight based on the amount of the aqueous solution of the monomer.

The resulting graft copolymer film is subjected to extraction with water in order to remove the unreacted monomer and the produced homopolymer before it is treated with an aqueous solution of alkali such as caustic potassium. The temperature and the time of this treatment are in the range of room temperature to 90° C. and in the range of about 5–120 minutes, respectively. The concentration of the aqueous solution of alkali is, preferably, in the range of 2–10% by weight. The graft copolymer film obtained through the series of various process steps mentioned above can provide a separator for use in a cell which has very low electrical resistance and stable performance. Thus, with this separator the performance and the life of various cells or batteries using aqueous solutions of an acid and an alkali as an electrolyte, say the lead-storage battery, the nickel-cadmium battery, the silver oxide battery, the nickel-zinc battery and the like, may be remarkably improved.

The dose rate and the total dose of ionizing radiation which can be employed in the practice of the present invention for obtaining useful graft copolymer films are in the range of $5 \times 10^4$–$10^7$ rads/sec. and in the range of 2–30 Mrads, respectively.

The preferred range of the concentration of graft monomers is between 10 and 60% by weight. If the concentration exceeds 60% by weight, the swellability at grafted portions decreases, and as a result, the diffusion of the graft monomer into the inside of the film becomes unsatisfactory. Thus, the advantage due to the increased concentration of the monomer is not substantial. If the concentration is less than 10% by weight, the rate of graft reaction decreases to result in the reduction of productivity. It is necessary to remove in advance any dissolved oxygen remaining in the aqueous solution of the monomer, since it hinders the progress of graft reaction. This can be done by degassing the aqueous solution of the monomer by freezing method in vacuum, or alternatively, an inert gas such as nitrogen can be bubbled into the solution to replace the oxygen.

The invention will be explained in more detail by the following examples, but it should be noted that the present invention cannot be limited by those examples.

Film strips of high density polyethylene 20 $\mu$m thick were irradiated in the atmosphere of nitrogen by making use of the resonant transformer type electron beam accelerator at various dose rates to obtain several samples of film. These samples were contacted in vacuum of $10^{-4}$ mmHg with an aqueous solution of a graft monomer (containing 50% by weight of acrylic acid and 0.25% by weight of Mohr's salt) which had been previously treated by bubbling with nitrogen in order to remove oxygen dissolved in the solution. The reaction was continued at 25° C. for 5 hours before the thus produced graft copolymer film was taken out of the solution, and then was washed with water to remove by extraction unreacted monomer and the produced homopolymer followed by drying the same film. The results of measuring the degree of grafting with respect to this film is as shown in FIG. 1. In FIG. 1 the co-relation between the total dose (Mrads) and the degree of grafting (%) is shown, with abscissa representing the total dose and ordinate representing the degree of grafting (%). As is obvious from the figure, the minimum total dose which is considered to be effective in the practice of the invention is 1 Mrad or higher, but the dosage exceeding 30 Mrads does not make any substantial difference.

Figure 2:
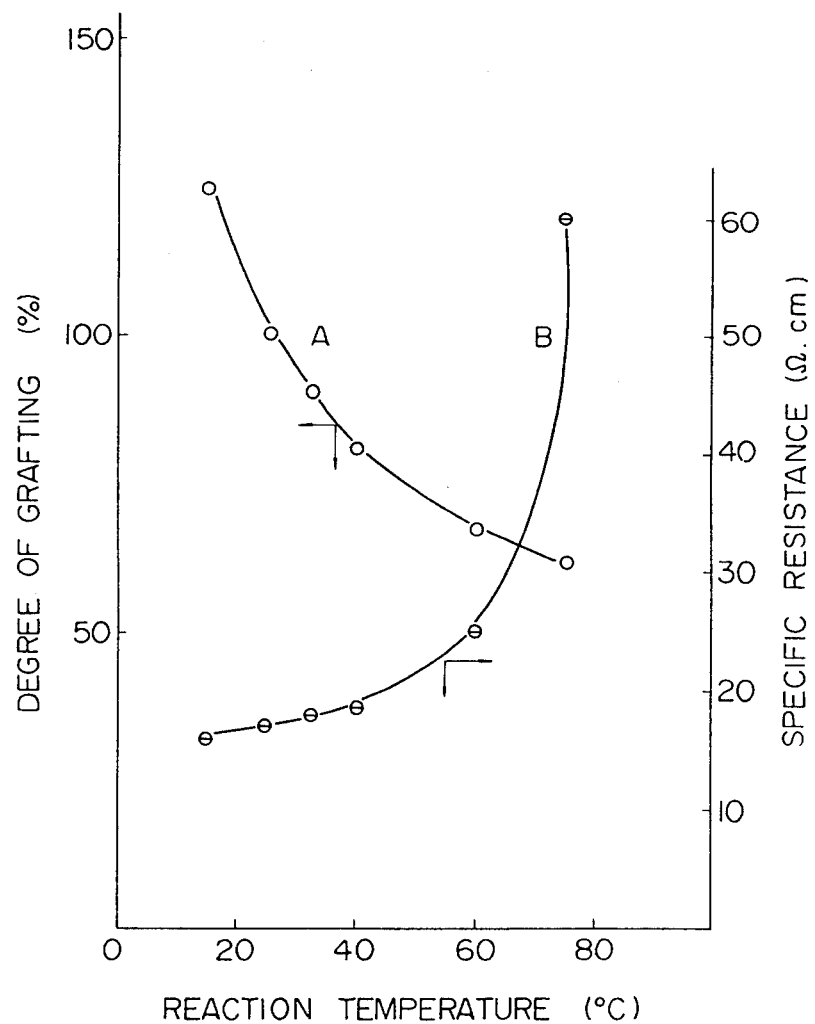
FIG. 2 shows the correlations of the ambient temperature at which the graft copolymerization reaction is carried out with each of the degree of grafting and the specific resistance of the membrane, respectively, in the production process of the present invention.

FIG. 2 shows the relationship between the temperature of graft copolymerization and each degree of grafting and the specific resistance of the graft copolymer film (determined in an aqueous 40% solution of KOH), respectively, obtained from the experiment which has been carried out under the same conditions as in the above mentioned case but the dosage being 20 Mrads. Abscissa represents the temperature of reaction of polymerization (°C.) and ordinate represents each degree of grafting (%) and the specific resistance value ($\Omega$.cm). Curve A represents the degree of grafting, and Curve B represents the specific resistance. The degree of grafting does not decrease even if the temperature exceeds 60° C., but in such case, the graft copolymerization proceeds unevenly due to the elevated reaction temperature and as a result the specific resistance of the graft copolymer film increases remarkably.

EXAMPLE 1

A high density polyethylene film 20 $\mu$m thick was irradiated in an atmosphere of nitrogen with electron beams generated from the resonant transformer accelerator under the conditions of 2 MeV of acceleration voltage and 1 mA of acceleration current for a total dose of 20 Mrads. Then, under vacuum of $10^{-4}$ mmHg, the irradiated polyethylene film was contacted with an aqueous solution of a graft monomer (containing 50% by weight of acrylic acid and 0.25% by weight of Mohr's salt) from which the dissolved oxygen had been previously expelled by bubbling with nitrogen and was maintained at 25° C. for 5 hours to proceed the graft reaction. When the reaction was finished, the produced graft copolymer film was taken out of the solution and was washed with water to remove by extraction unreacted monomer and the produced homopolymer followed by drying the washed film. The degree of grafting of this film was 125%. The specific resistance of this film determined by the 1000 Hz alternating current method in 40% KOH after treating in an aqueous 2.5% solution of caustic potassium at 90° C. for 120 minutes was 16 $\Omega$.cm.

For comparative purposes, the same experiment as mentioned above was repeated except that the temperature of the graft reaction was 75° C. In this case, when the graft reaction was finished, the formation of a large amount of the homopolymer was observed and the whole reaction system appeared as a gel. The graft copolymer film was recovered and was washed with water repeatedly to remove the undesired portions from the graft copolymer film. A film having the degree of grafting of 60% was obtained. The specific resistance of this film determined in the same manner as mentioned above after the treatment with caustic potassium was 60 $\Omega$.cm. The degree of grafting of this film was not so low, but the grafting was not uniformly distributed.

By using these two separators, open type nickel-cadmium batteries (having the nominal capacity of 80 AH) were prepared and comparative experiments to determine the discharge capacities of these batteries were conducted. The experiments were carried out at the discharge rates of 1C (80 A) and 4C (320 A), respectively, and the final voltages of 1.0 V and 0.8 V, respectively. The results are shown in Table 1 below.

TABLE 1

| | Discharge rate | | | |
| --- | --- | --- | --- | --- |
| | 1C FV = 1.0 V | | 4C FV = 0.8 V | |
| Separator | Capacity | Mean voltage | Capacity | Mean voltage |
| Separator in Example | 75 min. 12 sec. | 1.228 V | 17 min. 38 sec. | 1.072 V |
| Separator in Comparative Example | 68 min. 40 sec. | 1.211 V | 14 min. 8 sec. | 1.051 V |

As is evident from Table 1, the cell using the separator prepared by the present invention shows excellent results in high rate discharge characteristics.

EXAMPLE 2

A high density polyethylene film 20 $\mu$m thick (80 mm wide and 150 mm long) was irradiated under such a condition that the polyethylene film was in contact with air by reciprocating the sample placed on a conveyor at a dose rate of $1 \times 10^5$ rads/sec by using a resonant transformer accelerator with an acceleration voltage of 2 MeV and a current of 1 mA to give a dose of $3 \times 10^7$ rads. When the irradiation was finished, the polyethylene film was fully deaerated in a vacuum of $10^{-4}$ mmHg. The thus deaerated polyethylene film was immersed in a reaction solution which had been prepared by adding 0.25% of the Mohr's salt to an aqueous 50% by weight solution of an acrylic acid followed by reducing the oxygen content thereof to 0.1 ppm or less by blowing-in of nitrogen gas to carry out the reaction in a constant-temperature-bath of 25° C. When the reaction was finished, the graft copolymer film was washed fully with water to remove the unreacted monomer and the homopolymer therefrom by extraction followed by drying the film. The degree of grafting was determined from the increase in weight of the film. The graft copolymer film was treated with an aqueous 2.5% by weight solution of caustic potassium at 90° C. for 1 hour to provide a potassium salt type product of the film which was then immersed in an aqueous 40% by weight solution of caustic potassium for 24 hours and the electrical resistance thereof was measured at 25° C. with alternating current of 1000 Hz.

Figure 3:
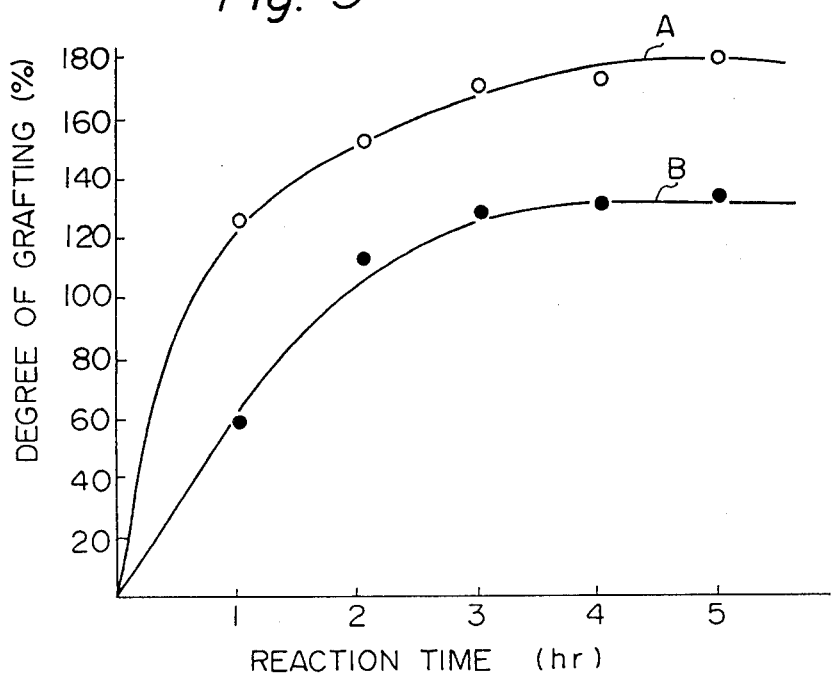
FIGS. 3 and 4 show the correlation of the time of graft copolymerizing reaction with the degree of grafting in the production process of the present invention.

On the other hand, another test strip of the polyethylene film was irradiated in the same manner as mentioned above in the atmosphere of nitrogen gas to carry out the graft polymerization reaction. The relations between the reaction temperature and the degree of grafting with respect to the films prepared by irradiating in air and in nitrogen, respectively, to carry out the graft reaction are shown in FIG. 3. In the same figure, Curve A shows the case in which irradiation was carried out in air, and Curve B shows the case in which irradiation was carried out in nitrogen. The results of determining the electrical resistance are shown in Table 2.

TABLE 2

Electrical Resistance of Graft Copolymer Films

| Graft Copolymer Film | Irradiation Atmosphere | Reaction Time | Degree of Grafting (%) | Electrical Resistance (mΩ · cm$^2$) |
|---|---|---|---|---|
| A | in air | 1 | 125 | 45 |
| B | in nitrogen | 1 | 30 | $1 \times 10^4$ |
| C | in nitrogen | 3 | 128 | 60 |

As is obvious from these results, when irradiation is carried out in air, it is possible to attain a high level degree of grafting with a relatively small total dose and a relatively short reaction time. Thus, the irradiation in air is excellent from the viewpoint of productivity. In the case of irradiation in nitrogen, a larger dose and longer reaction time are required than in the case of irradiation in air, but more uniform grafting is obtainable and the quality of the product film is more stable than in the case of irradiation in air. Another advantage in the case of irradiation in nitrogen is that even if there is a rather long lapse of time between the step of irradiation and the step of grafting, still it is possible to provide graft copolymer films which are uniform in graft distribution and stable.

Open type nickel-cadmium batteries (with nominal capacity of 80 AH) were prepared by using the graft copolymer films A and C, respectively, as separators to be used therein, and the comparative tests of the performance characteristics of these batteries were conducted at the discharge rates of 1C (80 A) and 4C (320 A), respectively, with the final voltages of 1.0 V and 0.8 V, respectively. The results are shown in Table 3.

TABLE 3

Results of the Tests of Performance Characteristics of the Batteries

| | Discharge rate | | | |
|---|---|---|---|---|
| | 1C. Final Voltage 1.0 V | | 4C. Final voltage 0.8 V | |
| Separator | Discharge Holding Time | Mean Voltage | Discharge Holding Time | Mean Voltage |
| A | 73 min. 16 sec. | 1.228 V | 17 min. 38 sec. | 1.072 V |
| C | 70 min. 51 sec. | 1.213 V | 15 min. 08 sec. | 1.052 V |

The results of discharge tests shown in the above table are those which depend on the difference in electrical resistance. As is obvious from these results, there is almost no difference between the cases of irradiation in air and in nitrogen. In both cases, the films were satisfactory in their performance as separators for use in cells.

EXAMPLE 3

The graft reaction was carried out in the same manner as in Example 2 except that a low density polyethylene film 30 μm thick was used and the irradiation was effected for a total dose of 5×6$^6$ rads. The degree of grafting of the graft copolymer film prepared under irradiation in air for a reaction time of 3 hours was 110% and the electrical resistance of the same film was 50 mΩ.cm$^2$. In contrast, the degree of grafting of the graft copolymer film prepared in the similar manner as above but under irradiation in nitrogen for the same reaction time of 3 hours was 75% and the electrical resistance of the same film was 80 mΩ.cm$^2$. The longer reaction time did not increase the degree of grafting any more. These graft copolymer films prepared under irradiation in air and in nitrogen, respectively, were used as separators in batteries. Upon performance testing of these batteries at 1C, the graft copolymer film obtained under irradiation in air showed a discharge holding time of 72 minutes 10 seconds and a mean voltage of 1.221 V, while the graft copolymer film obtained under irradiation in nitrogen showed a discharge holding time of 69 minutes 57 seconds and a mean voltage of 1.203 V.

EXAMPLE 4

The same polymer film as used in Example 1 was grafted in the same manner as in Example 1 using as a reaction liquid an aqueous 20% by weight of methacrylic acid solution to which 0.25% of Mohr's salt had been added. When the above mentioned graft reaction was carried out for 1 hour under irradiation in air, a separator having the degree of grafting of 173% and an electrical resistance of 85 mΩ.cm$^2$ was obtained. When the same graft reaction was carried out for 3 hours under irradiation in nitrogen, a separator having the degree of grafting of 118% and an electrical resistance of 135 mΩ.cm$^2$ was obtained. Batteries were prepared using each of these separators and the performance tests of these batteries were conducted at a discharge current value of 1C. The battery employing the separator prepared under irradiation in air showed a discharge holding time of 69 minutes 45 seconds and a mean voltage of 1.209 V, while the battery employing the separator prepared under irradiation in nitrogen showed a discharge holding time of 67 minutes 14 seconds and a mean voltage of 1.201 V.

The experimental results in both Examples 3 and 4 were similar to those in Example 2.

The organic polymers which can be used in the practice of the present invention for preparing the substrate layers include those polymers which can be grafted such as ethylene tetrafluoride-ethylene copolymers, poly(ethylene tetrafluoride), poly(vinylidene fluoride), vinylidene fluoride-ethylene tetrafluoride copolymers, poly(vinyl fluoride) and the like fluorine containing polyolefine as well as carbon system polyolefinic resins such as polyethylene, polypropylene and the like.

The graft-forming, terminally unsaturated hydrophylic monomers which can be used in the practice of the present invention include acrylic acid, methacrylic acid, stylene sulfonic acid, vinylpyridine, vinyl sulfonic acid and the like.

The aqueous solutions of monomer(s) can optionally include, as occasion demands, chlorinated organic solvents such as ethylene dichloride, carbon tetrachloride and the like. Particularly when at least one, or two or more members selected from such chlorinated organic solvents or from the group consisting of methyl alcohol, ethyl alcohol and isopropyl alcohol are used in an amount of 2-15% by weight, it is possible to accelerate the rate of polymerization and to increase the finally attainable degree of grafting.

EXAMPLE 5

A high density polyethylene film (20 μm thick) was irradiated in the atmosphere of nitrogen by using a resonant transformer accelerator at an acceleration voltage of 2 MeV and an acceleration current of 1 mA for a total dose of 20 Mrads. Then, the irradiated film was fully deaerated in a vessel in vacuum of $10^{-4}$ mmHg. In a reaction liquid comprising a mixture of 50 parts of acrylic acid, 48 parts of water and 2 parts of isopropyl alcohol (which had been previously degassed to obtain the oxygen content of 0.1 ppm or less), said polyethylene film was immersed and the reaction was made to proceed in a constant-temperature-bath at 25° C. When the reaction was finished, the graft copolymer film was fully washed with water to remove by extraction unreacted monomer and homopolymer contained in the film, followed by drying the same. The degree of grafting was determined based on the increase in weight of the dried film after said grafting reaction. The degrees of grafting for the respective times of reaction were 50% for 30 minutes, 120% for 1 hour and 123% for each of 3 hours and 5 hours. On the other hand, when the graft polymerizations similar to those as mentioned above were carried out with a 50% aqueous solution of acrylic acid without the addition of isopropyl alcohol, the degrees of grafting attained for the respective times of reaction were 25% for 30 minutes, 50% for 1 hour, 100% for 2 hours, 105% for 3 hours and 108% for 5 hours. Thus, the time of reaction necessary for achieving the degree of grafting of 100% has been shortened by about 1 hour by the addition of isopropyl alcohol. The electrical resistance of the separators obtained for the reaction time of 5 hours in this Example and Comparative Example determined by the 1000 Hz alternating current method in a 40% aqueous solution of potassium hydroxide at 25° C. were 45 m$\Omega$.cm$^2$ and 70 m$\Omega$.cm$^2$, respectively.

Next, using these separators, closed type silver oxide batteries (Ag$_2$O/Zn) the JIS code of which is G-13 were prepared and discharge performance tests were conducted with respect to these batteries. The discharge tests were carried out at temperatures of $-20°$ C. and 24° C. with the constant resistance of 60$\Omega$ and 600$\Omega$, said discharge being continued until the final voltage becomes 1.0 V. Under said discharge conditions, the discharge holding times were determined. The results are shown in Table 4 below.

TABLE 4

| Sample No. | Separator | Temperature | | |
|---|---|---|---|---|
| | | $-20°$ C. | 24° C. | 24° C. |
| | | Resistance | | |
| | | 60$\Omega$/FV 1.0 V | 60$\Omega$/FV 1.0 V | 600$\Omega$/FV 1.0 V |
| 1 | Separator obtained with the addition of isopropyl alcohol | 25 minutes | 219 minutes | 70.5 hours |
| 2 | Separator obtained without the addition of isopropyl alcohol | 20 minutes | 190 minutes | 63.2 hours |

Figure 4:
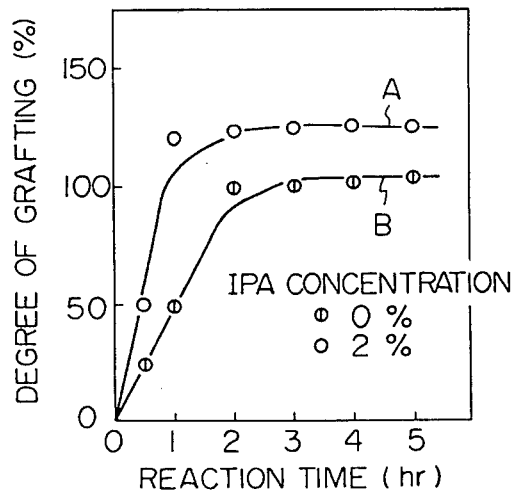

The relationship between the degree of grafting and the reaction time is shown in FIG. 4. The ordinate represents the degree of grafting (%) and the abscissa represents the reaction time (hr). The Curve A in the same figure represents the case wherein isopropyl alcohol (IPA) was used in 2% and the Curve B represents the case wherein no IPA was added.

As is obvious from FIG. 4, the system which includes the addition of isopropyl alcohol is superior to the system which does not include the addition of isopropyl alcohol in both the rate of graft reaction and the final degree of grafting. This results in the following advantages. For example, when a separator having the degree of grafting of 100% is to be obtained, the system which includes such addition as mentioned above can reach the goal in shorter reaction time than the system which includes no such addition. On the other hand, if a separator having the degree of grafting of 120% or higher is wanted, 1 hour of reaction is satisfactory for the system which includes the addition of isopropyl alcohol under the conditions as shown in the same figure, while for the system without the addition of isopropyl alcohol, it is necessary either to enhance the dose in the step of pre-irradiation or to hold the reaction temperature at lower level and make the reaction time longer. Either one of these alternatives is poor in productivity and so is disadvantageous. Though the true mechanism of reaction due to the addition of an alcohol according to the present invention has not been fully revealed yet, it is considered that such advantages are brought about because the affinity of an alcohol to polyethylene is greater than the affinity of a monomer such as acrylic acid or than the affinity of water to polyethylene and, in addition, alcohol is compatible with water. Namely, it is considered that though polyethylene is not swollen with an aqueous solution of acrylic acid, the grafted chains comprising poly(acrylic acid) can be swollen with water since poly(acrylic acid) is hydrophilic. As a result, the monomer diffuses and the graft reaction proceeds from the surface of the film to the inside thereof. Thus, it is considered that due to the co-existence of an alcohol which has greater affinity to polyethylene, the diffusion of the aqueous solution of monomer toward the inside of polyethylene becomes easier, and as a result, the graft reaction can take place more easily.

Other experiments were carried out in the same manner as in Example 5 except that methyl alcohol or ethyl alcohol was used instead of isopropyl alcohol. Similar advantageous results were obtained.

Alcohols which can be added to the aqueous solutions of monomers according to the present invention include one or a mixture of two or more members selected from the group consisting of methyl alcohol, ethyl alcohol, isopropyl alcohol and the like. The amount of the selected alcohol to add is in the range of 0.5-15% by weight, preferably in the range of 2-15% by weight and most preferably in the range of 2-5% by weight based on the weight of the aqueous solution of monomer. If the amount of addition is too small, no substantial advantage will be obtained. If the amount of addition is too large, the maximum degree of grafting will not be obtained.

Figure 5:
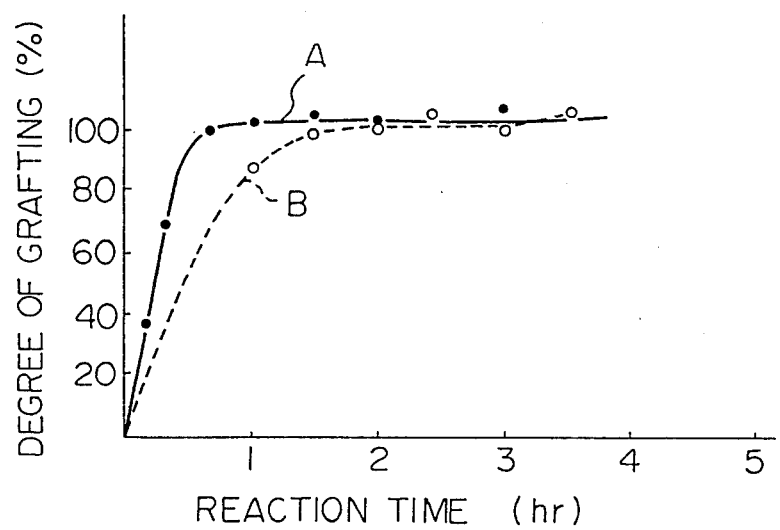
FIG. 5 shows the effects and advantages of chlorinated organic solvents in both the rate of graft reaction and the final degree of grafting.

That the chlorinated organic solvents in fact accelerate the rate of polymerization and increase the finally attainable degree of grafting is clear from the attached FIG. 5 which relates to results conducted using Example 5. Thus, Example 5 was repeated using the same procedure except that ethylene dichloride was used instead of isopropyl alcohol to determine the relationship between reaction time and degree of grafting. The results obtained are shown in FIG. 5. In FIG. 5, the Curve A represents the case when ethylene dichloride was used in an amount of 5% and the Curve B represents the case when no ethylene dichloride was added. As is obvious from FIG. 5, the system which includes ethylene dichloride is superior to the system which does not include ethylene dichloride in both the rate of graft reaction and the final degree of grafting. Especially the effects and advantages of chlorinated organic solvents are to transfer the radicals of graft chain to produce uniform grafted film and to swell the polyethylene film for easy impregnation of monomer solution to accelerate the rate of the graft reaction.

When a separator comprising a graft copolymer film is immersed in or is placed in contact with an electrolyte comprising an aqueous solution of an acid or an alkali, dimensional changes occur in the directions of thickness, width and length as a result of swelling. When a graft copolymer film prepared by grafting acrylic acid or methacrylic acid onto a substrate film prepared by the conventional method is immersed in an electrolyte, three-dimensional increase in size in the directions of thickness, width and length as a result of expansion is observed. The rate of this dimensional increase as a result of swelling is approximately proportional to the degree of grafting of the graft copolymer film. For example, when a membrane comprising a polyethylene film base having grafted thereon about 110% thereof of acrylic acid is immersed in an aqueous 40% solution of KOH which is an electrolyte of an alkali battery, the rate of dimensional increase due to swelling in each of said three dimensions is in the range of about 13–14%. If this kind of a membrane which exhibits a large dimensional change when immersed in an electrolyte is practically used, a number of disadvantages may occur. For example, in the case of assembly of a closed button type silver oxide battery, a separator and a liquid-holding paper are stacked and the resulting assembly is punched out simultaneously into a circular shape of predetermined dimension, followed by placing the punched-out circular piece on an active material and it is swollen with an electrolyte. When a separator used in this embodiment is one which swells substantially with the electrolyte, the size of the separator will become larger than the outer diameter of the battery shell. If, alternatively, the above mentioned punching out is done in prospect of substantial swelling of the separator specifically used, the other member of the resulting battery such as the liquid-holding paper will become too small, correlatively. Thus, in any case, dimensional change in the separator is undesirable in the production of a battery. Furthermore, when an ion exchange membrane has a high degree of swelling, the selective permeability to ions generally decreases. Batteries using these separators have various defects. For example, in the case of a silver oxide battery, silver acid ion $Ag(OH)_2^-$ resulting from dissolution of the silver oxide as a positive active material in an electrolyte easily penetrates the separator to reach the negative electrode, where it is reduced to metallic silver to result in self-discharge. When this occurs markedly, a bridge is formed between the electrodes by the silver deposited on the negative electrode and as a result an internal short circuit is brought about to decrease the performance of the cell.

In the practice of the present invention, the use of a non-stretched film as a base material enables to make uniform or control the dimensional changes in both longitudinal and transverse directions of the film which may be caused in the course of or after grafting due to the action of an acidic or an alkaline electrolyte on the film. The non-stretched films can be prepared by heat-treating general-purpose high polymer films in hot water bath or by the hot press of films. Alternatively, they can also be prepared by rolling a powder of a high polymer into a molded rod followed by slicing the resulting rod. Either one of these alternatives can be chosen arbitrarily depending on the intended purpose.

EXAMPLE 6

A grafted membrane having the degree of grafting of 110% was prepared by treating in the same manner as in Example 1 a non-stretched polyethylene film membrane (20 μm thick and having a molecular weight of 1,000,000) which had been prepared by the slicing method. The dimensional changes of this membrane based on the size of the substrate film were a 5% increase in both the longitudinal and transverse directions.

In contrast, another grafted membrane having the degree of grafting of 118% was prepared by grafting in the same manner as mentioned above onto a polyethylene film membrane 20 μm thick which had been prepared by the conventional film-forming method generally referred to as the "inflation method". The longitudinal and transverse increases of this film based on the original size of the same film were 20% and 10%, respectively. When this film was immersed in an aqueous 40% solution of KOH, the dimensional changes in both longitudinal and transverse directions were 30% increase and 20% increase, respectively.

As is evident from these results, the dimensional change of the membrane was improved by the use of said sliced membrane. The degree of improvement were 4–5 times with respect to the longitudinal dimensional change, and 2–3 times with respect to the transverse dimensional change. Another advantage of using said sliced membrane was that since the dimensional changes in both longitudinal and transverse directions were uniform, it is easy to handle the film during the period of graft copolymerization reaction.

Using the grafted membrane thus obtained as a separator, a button type silver oxide cell (JIS code G-13) was composed. The inner diameter of the outer shell (positive electrode) of this cell was 11 mm. The separator was punched out into the shape of a disc having the diameter of 10.8 mm. This separator was placed securely on a positive active material and an electrolyte comprising an aqueous 40% solution of KOH was dropped thereon. The diameter of the separator of the present application after absorbing the electrolyte was 11.0 mm, and accordingly it was easy to assemble the cell. In contrast, the control separator changed into the shape of an ellipse having the major axis of 14 mm and the minor axis of 13 mm. Thus, the separator became larger than the outer shell and it was impossible to assemble a cell with said shell. Then, the comparative experiments were conducted with respect to the discharge performance of each of the cells prepared by using these separators. In view of the significant swellability of the control separator due to its absorbing electrolyte, the control separator was punched out in smaller size before a cell was assembled therewith. Using these cells, comparative tests were carried out to determine the discharge characteristics of them at the time immediately after the preparation thereof and again after being stored for a predetermined period of time at a temperature of 60° C.

The discharge experiments were made at a temperature of 24° C. with a resistance of a fixed value of either 60Ω or 600Ω and the final voltage of 1.0 V. The storage period was either 1 month or 3 months. The results of these experiments are shown in Table 5 below.

TABLE 5

Results of Discharge Tests

| Separator | Storage Period | | | | | |
|---|---|---|---|---|---|---|
| | Immediately after preparation | | 1 month | | 3 months | |
| | Rate of Discharge | | | | | |
| | 60Ω | 600Ω | 60Ω | 600Ω | 60Ω | 600Ω |
| Separator used in Example 1 | 320 min. | 67 hr. | 311 min. | 60 hr. | 310 min. | 64 hr. |
| Control Separator | 318 min. | 65 hr. | 305 min. | 60 hr. | 264 min. | 51 hr |

As is obvious from Table 5, the cell using the separator mentioned in Example 1 showed excellent storage characteristics. The method of further controlling the swellability of the graft copolymer membrane by the action of an electrolyte is to add a water-soluble multifunctional monomer to an aqueous solution of monomer. It has been confirmed that by using such a multifunctional monomer, it is possible to control the swelling with an electrolyte and also to improve the ability of avoiding harmful materials without increasing the electrical resistance.

When a membrane on which acrylic acid or the like is grafted is used, polyacrylic acid in the polymer matrix is swollen with water due to the solubility in water of the polyacrylic acid, when it is immersed in an electrolyte comprising an aqueous solution of acid or alkali. As a result, the dimension of the grafted membrane increases. When a hydrophilic multi-functional monomer co-exists in an aqueous solution of acrylic acid, the graft polymerization of the multi-functional monomer also occurs, and a bridge is formed between the polymer-chains of the grafted acrylic acid. Thus, the graft polymer forms a three-dimensional net-work structure. Such a net-work structure of these graft polymer chains is considered to be effective to control expansion of the polymer matrix by swelling with water. Due to the cross-linkings formed between the grafted chains, the separator becomes a fine, three-dimensional structure, which helps the separator to show its selectivity to ions to the full. For example, in the case of a silver oxide cell, the amount of silver acid ions which penetrate the separator, said silver acid ions being dissolved in an electrolyte, decreases, and the loss capacity of a cell using this separator due to its self-discharge has been remarkably reduced.

The cross-linking in the separator of the present invention is quite different from the cross-linking existing between the molecules of a polymer which constitutes a substrate matrix such as polyethylene. In the former case, the cross-linking polymer itself is water-soluble. Thus, in the case of the separator of the present invention, it is possible for an electrolyte to penetrate into the depth of the minute net-work structure, and accordingly no increase in the electrical resistance is observed in spite of cross-linking the graft copolymer.

The hydrophilic, multi-functional monomers which can be added to an aqueous solution of a monomer according to the present invention include polyethylene glycol diacrylate or polyethylene glycol dimethacrylate having the formula:

$$CH_2=CHCOO(CH_2CH_2O)_nCOCH=CH_2 \text{ or}$$

$$CH_2=C(CH_3)COO(CH_2CH_2O)_nCOC(CH_3)=CH_2,$$

respectively, wherein n is an integer of 3 or more, preferably n is an integer of 4–14.

When n is too small, the solubility in an aqueous solution of acrylic acid or/and methacrylic acid is unsatisfactorily low, while when n is too large, the cross-linking in the graft copolymer chains is uneffective and impractical. The amount of the hydrophilic multi-functional monomer to be added is in the range of 1–15% by weight, more preferably in the range of 2–10% by weight based on the amount of an aqueous solution of the monomer.

EXAMPLE 7

A high density polyethylene film 20 μm thick was irradiated with ionizing radiation by using a resonant transformer accelerator in the same manner as in Example 1 in the atmosphere of nitrogen at room temperature for a total dose of 20 Mrads. Then, the irradiated film was immersed in a reaction liquid comprising an aqueous 50% by weight solution of acrylic acid to which 10% by weight of tetraethylene glycol dimethacrylate and 0.25% by weight of Mohr's salt had been added (said liquid being deaerated in advance to reduce the oxygen content thereof to 0.1 ppm or less), and the reaction was carried out in a constant temperature bath of 25° C. for 5 hours. When the reaction was finished, the grafted membrane thus obtained was fully treated with water to remove by extraction unreacted monomer retained therein and homopolymer produced during the reaction followed by drying the thus treated membrane. The degree of grafting of this grafted membrane was 113%. When this grafted membrane was immersed in an aqueous 40% solution of KOH, the rates of dimensional increase caused by swelling in the directions of length, width and thickness were about 5%, respectively.

On the other hand, another graft copolymer film having the degree of grafting of 118% was prepared in the same manner as mentioned above except that tetraethylene glycol dimethacrylate was not added. The rate of dimensional increase as a result of swelling determined by immersing in an aqueous 40% solution of KOH was about 14%.

The electrical resistances of the separators obtained in the working and comparative examples mentioned above determined in an aqueous 40% solution of KOH at 25° C. were 65 mΩ.cm² and 60 mΩ.cm², respectively. Then, the rate of diffusion permeation of the silver acid ion through the separator was determined by the following method.

A vessel was divided into two compartments by the membrane to be examined. An aqueous 40% solution of KOH saturated with silver acid ions was placed in one compartment and an aqueous 40% solution of KOH containing no silver acid ions was placed in the other compartment. After two hours, the amount of silver which had moved from one compartment to the other by passing through the separator was determined. With respect to each of the separators prepared in the working and comparative examples mentioned above, the amount of silver passing through was determined by the method mentioned above. In the former case, the amount thus determined was $1.2 \times 10^{-6}$ mole/hr.cm², and in the latter case, it was $3.5 \times 10^{-5}$ mole/hr.ch².

Then, a closed type silver oxide cell ($Ag_2O/Zn$) was assembled using each of said separators. The control separator was punched out in the size smaller than that when it was used in the cell considering its degree of swellability with the electrolyte. Each of the cells thus prepared was tested to determine its discharge characteristics at the time immediately after its preparation and again after a certain period of storage at a temperature of 60° C. The discharge was effected at 24° C. using in one case a constant resistance of 60Ω and in another case a constant resistance of 600Ω, each case with the final voltage of 1.0 V. Two levels of storage period, 1 month and 3 months, were used. The results are shown in Table 6 below.

TABLE 6

| | Storage Period | | | | | |
|---|---|---|---|---|---|---|
| | Immediately after preparation | | 1 month | | 3 months | |
| | Rate of Discharge | | | | | |
| Separator | 60Ω | 600Ω | 60Ω | 600Ω | 60Ω | 600Ω |
| Separator used in Example | 320 min. | 69 hr. | 317 min. | 69 hr. | 316 min. | 65 hr. |
| Control Separator | 318 min. | 65 hr. | 308 min. | 60 hr. | 264 min. | 51 hr. |

As is obvious from Table 6, the cells prepared by using the separators of the present invention showed remarkably improved storage characteristics. When these experiments were finished, the cells were dismantled to examine whether silver acid ions had passed through the separator used in each of the cells. It was observed that in the cells prepared by using the separators of the present invention, no silver acid ions reached the negative electrode. In contrast, in the cells prepared by using the control separators, it was observed that a substantial number of silver acid ions had passed through the separator and as a result self-discharge had occurred.

As is evident from the above explanation, the present invention is very useful from an industrial viewpoint.

The above examples are shown only for purposes of illustration and it will be apparent to those skilled in the art that many variations can be made therefrom without departing from the scope of this invention defined by the following claims.

What is claimed is:

1. A process of the production of separators for use in cells comprising
irradiating a film of an organic polymer 150 μm or less thick with ionizing radiation at a dose rate of $5 \times 10^4$–$10^7$ rads/sec. to give a total dose of 1 Mrad or more,
thereafter contacting the irradiated film with an aqueous solution of a terminally unsaturated monomer substantially free of oxygen and containing at least one chlorine-containing organic solvent selected from the group consisting of ethylene dichloride and carbon tetrachloride, at a temperature of 10° C.–60° C. to thereby bring about the graft copolymerization of said monomer onto said film and
then treating the grafted film with an aqueous alkaline solution.

2. The process as defined in claim 1 wherein said organic polymer is one selected from polyolefin resins.

3. The process as defined in claim 2 wherein said polyolefin resin is polyethylene.

4. The process as defined in claim 1 wherein said terminally unsaturated monomer is at least one member selected from the group consisting of acrylic acid, methacrylic acid, styrene sulfonic acid, vinyl pyridine and vinyl sulfonic acid.

5. The process as defined in claim 1 wherein said aqueous solution comprises 10–60% by weight of a terminally unsaturated monomer, 0.01–2.5% by weight of Mohr's salt and 37.5–89.99% by weight of water.

6. The process as defined in claim 1 wherein said aqueous solution of an alkali is an aqueous 2–10% by weight solution of an alkali hydroxide.

7. The process as defined in claim 1 wherein said aqueous solution of a terminally unsaturated monomer contains 2–15% by weight of at least one member selected from the group consisting of methyl alcohol, ethyl alcohol and isopropyl alcohol.

8. The process as defined in claim 1 wherein the irradiation is carried out either in vacuum or in an inert gas.

9. The process as defined in claim 1 wherein the irradiation is carried out either in air or in an oxygen atmosphere.

10. The process as defined in claim 1 wherein said film is an unstretched film.

11. A process as defined in claim 1 further comprising subjecting said film to extraction with water after the graft polymerization and before treatment with aqueous alkaline solution, in order to remove unreacted monomer and homopolymer.

12. A process as defined in claim 7 wherein said treatment with alkali hydroxide is effected at room temperature to 90° C. for 5–120 minutes.

13. A process as defined in claim 1 wherein the total dose of ionizing radiation is 2–30 Mrads.

14. A process as defined in claim 1 wherein the terminally unsaturated monomer comprises a mixture of acrylic acid and tetraethylene glycol dimethacrylate.

15. The process as defined in claim 1 wherein the oxygen content of said aqueous solution is 0.1 ppm or less.

16. The process as defined in claim 1 wherein said aqueous solution contains one inhibitor of homopolymerization selected from the group consisting of ferrous salt and cupric salt.

17. The process as defined in claim 12 wherein said inhibitor of homopolymerization is used within the range of 0.01–2.5% by weight based on the amount of the aqueous solution.

18. The process as defined in claim 1 wherein said aqueous solution contains chlorinated organic solvent.

19. The process as defined in claim 1 wherein said aqueous solution contains a hydrophilic multi-functional monomer.

20. The process as defined in claim 2 wherein said hydrophilic multi-functional monomer is selected from the group consisting of polyethylene glycol diacrylate and polyethylene glycol dimethacrylate having the general formula:

$$CH_2=CHCOO(CH_2CH_2O)_nCOCH=CH_2 \text{ or}$$

$$CH_2=C(CH_3)COO(CH_2CH_2O)_nCOC(CH_3)=CH_2$$

respectively, wherein n is an integer of 4–14.

* * * * *